(12) United States Patent
Ma

(10) Patent No.: US 6,335,940 B1
(45) Date of Patent: Jan. 1, 2002

(54) DIGITAL DATA EXCHANGE DEVICE

(75) Inventor: Huai-Chih Ma, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 09/105,984

(22) Filed: Jun. 29, 1998

(30) Foreign Application Priority Data

Jan. 19, 1998 (CN) .......................................... 87100666

(51) Int. Cl.[7] .............................. H04J 3/04; H04L 12/28
(52) U.S. Cl. ....................... 370/535; 370/394; 370/360
(58) Field of Search ................................ 370/360, 366, 370/363, 368, 369, 379, 381, 383, 394, 412, 413, 428, 535, 390, 392, 389, 396

(56) References Cited

U.S. PATENT DOCUMENTS 5,473,577 A  * 12/1995  Miyake et al. ............... 365/238
5,612,952 A  *  3/1997  Motoyama .................. 370/412

* cited by examiner

*Primary Examiner*—Wellington Chin
*Assistant Examiner*—Brenda H. Pham
(74) *Attorney, Agent, or Firm*—Sughrue, Mion, Zinn, Macpeak & Seas, PLLC

(57) ABSTRACT

A digital data exchange device, used for the dynamically electrical connection of a plurality of input ports to a plurality of output ports, which comprises: a first multiplexer, electrically connected to the plurality of input ports, used for selecting an input port to output data of the selected input port, wherein the data contains an output port ID; a demultiplexer, electrically connected to the first multiplexer and the plurality of output ports, used for selecting the output port based on the output port ID to output an input port ID to the output port; an address generator, electrically connected to the multiplexer and the demultiplexer, for sequentially generating the input port IDs of the plurality of input ports. This allows the first multiplexer to select the appropriate input port, so that the input port ID is transmitted to the output port by using the demultiplexer, thereby electrically connecting the input port to the output port.

10 Claims, 5 Drawing Sheets

DIGITAL DATA EXCHANGE DEVICE

BACKGROUND OF THE INVENTION

1. Field of the Invention

The invention relates to a digital data exchange device, in particular to a digital data exchange device for an Ethernet switching hub, in which the purpose of equal transmission of data packets is attained by using a polling method. Moreover, the use of a tire out mechanism prevents dead lock between input/output ports and the digital data exchange device caused by abnormal packets.

2. Description of the Related Art

In general, the switching hub is used in the arrangement of a starshaped local area network, and it connects individual computers to allow for the sharing of resources. The main purpose of the switching hub is to establish a data pathway between any two computers thereby allowing the computers to communicate with each other and initiate data transmission.

In a local area network, each computer typically corresponds to an output/input port of a switching hub. Each output/input port is allocated an address. In order for computer A to communicate with computer B, computer A must indicate the output/input port address of computer B to the switching hub. Then, via a digital data exchange device, the output/input port address of computer A is maintained on the output/input port of computer B, thereby establishing a data pathway. After the data path has been established, the output/input port of computer A will be accordingly stored in the output/input address of computes B, and computer B will only allow the data of computer A to access its output/input port; communication between computers A and B has thereby been established.

In the prior art, a digital data exchange device accepts requests for establishing data pathways and transmits data packets by a method of interruption. Namely, when computer A needs to communicate with the computer B, it sends a request to the output/input port of computer B. When computer B accepts this request, the port ID of computer A is stored on the output/input port of computer B, thus establishing a data pathway between computers A and B.

When distribution between the data flow of each output/input port is even, a request for establishing a data pathway is accepted by using a method of interruption. Therefore, the requirement of real time transmission is efficiently attained. However, current networks rarely exhibit an even distribution of data flow. For example, while a number of terminal computers may continuously communicate with a single network server, other computers may be simultaneously sending requests for establishing data pathways to that server. When a plurality of output/input ports {A1 . . . An} concurrently send requests for establishing data paths to an output/input port {B}, an arbitrator utilized in a conventional digital data exchange device will determine the priority by which the data will be transmitted to its respective destinations.

This arbitrator, in the prior art, randomly selects which of the output/input ports {A1 . . . An} can initiate communication with the output/input port {B}. In theory, if no other output/input ports {a1 . . . an} send requests at the time when all the requests sent output/input ports {A1 . . . An} have been processed by the arbitrator, the arbitrator will respond to the requests of the output/input ports in sequence to successfully complete the communications.

However, in a high capacity network, the abovementioned output/input ports {a1 . . . an} may inconsistently send their requests to the arbitrator prior to the arbitrator's completion of responding to the requests of output/input ports {A1 . . . An}. As a result, certain requests from output/input ports {A1 . . . An} and output/input ports {a1 . . . an} will be overlooked and subsequently omitted by the arbitrator. A situation of stalled communication will arise, causing the functional efficiency of the network to decrease substantially.

If each output/input port request is equally accepted, the probability that a request sent by each output/input port will be processed will accordingly be even.

Furthermore, since digital data is transmitted packet by packet, there exists an inter_frame gap between the transmission of any two packets, during which each individual packet is differentiated. If this inter_frame gap of time can be used, a request sent by an output/input port can be efficiently interpreted without utilizing the interruption method.

Although a request from an output/input port is likely to be omitted if there is no interruption, this problem can be perfectly resolved by using a buffer memory to record each request.

SUMMARY OF THE INVENTION

In view of the above, the present invention provides an enhanced Digital Data Exchange Device. It has been accomplished through a succession of advanced study and research, with the intent of overcoming the drawbacks encountered in the prior art. The main features of the invention are described below.

The invention, consisting of a data exchange device, applies a polling method to the output/input ports, and thereby is able to equally transmit the various data packets.

In the invention, the digital data exchange device, used to dynamically and electrically connect a plurality of input ports to a output ports, comprises: a first multiplexer electrically connected to the plurality of input ports, for selecting an output port thereof to output the data, which includes the output port ID of the input port; a demultiplexer electrically connected to the first multiplexer and the plurality of output ports, for selecting the output port therefrom in response to the output port ID; and an address generator electrically connected to both the multiplexer and demultiplexer, for generating the port ID of the plurality of input ports in sequence, so that the first multiplexer can select the input port and transmit its ID to the output port by using the demultiplexer, thereby connecting the input port to the output port.

Each of the plurality of input ports mentioned above comprises: a command decoder for decoding input data; and a series-to-parallel format converter, electrically connected to the command decoder and the first multiplexer, used for converting the data of the input port from a serial format to a parallel format.

In addition, the output port comprises: a first-in/first-out memory unit electrically connected to the demultiplexer, in which the input port ID, outputted from the demultiplexer, is written into FIFO in response to an address writing operation, and from which the input port ID is read out in response to an address-reading operation; a second multiplexer electrically connected to the first-in/first-out memory unit and the input ports, for transmitting the data from the input port through the output port in response to the data reading operation of the first-in/first-out memory unit; and a read/write pointer controller electrically connected to the first-in/first-out memory unit, for recording the address reading and writing operations and updating its values in response to the reading and writing operations of the first-in/first-out memory unit.

The digital data exchange device described further comprises: a pulse generator electrically connected to the plurality of output ports, for sending back a signal identified by the input port when the input port ID is transmitted to the second multiplexer.

Since the number of the input ports is 33, and the number of the output ports is 34, the multiplexer should be 33 inputs to 1 output, and the demultiplexer should be 1 input to 34 outputs for data exchanges.

The read/write pointer controller mentioned above comprises: a writing counter, electrically connected to the first-in/first-out memory unit, for sequentially recording address writing operations; and a reading counter, electrically connected to the first-in/first-out memory unit, for sequentially recording address reading operations.

Furthermore, the address generator is a counter which periodically produces input port IDs ranging from 0 to 32.

The above-mentioned counter, first-in/first-out memory unit, multiplexer, demultiplexer, command decoder and series-to-parallel format converter are well known to those skilled in the prior art. Therefore, the information about the present invention will not provide any further references to them. However, the structure and operational principles of the digital data exchange device in accordance with the invention will be described in detail hereinafter.

BRIEF DESCRIPTION OF THE DRAWINGS

The features of the invention, which will be more clearly understood through the detailed description given below and the accompanying drawings, given by way of illustration only and thus not limiting of the present invention's capacities, are as follows.

REFERENCE NUMERALS

Figure 1:
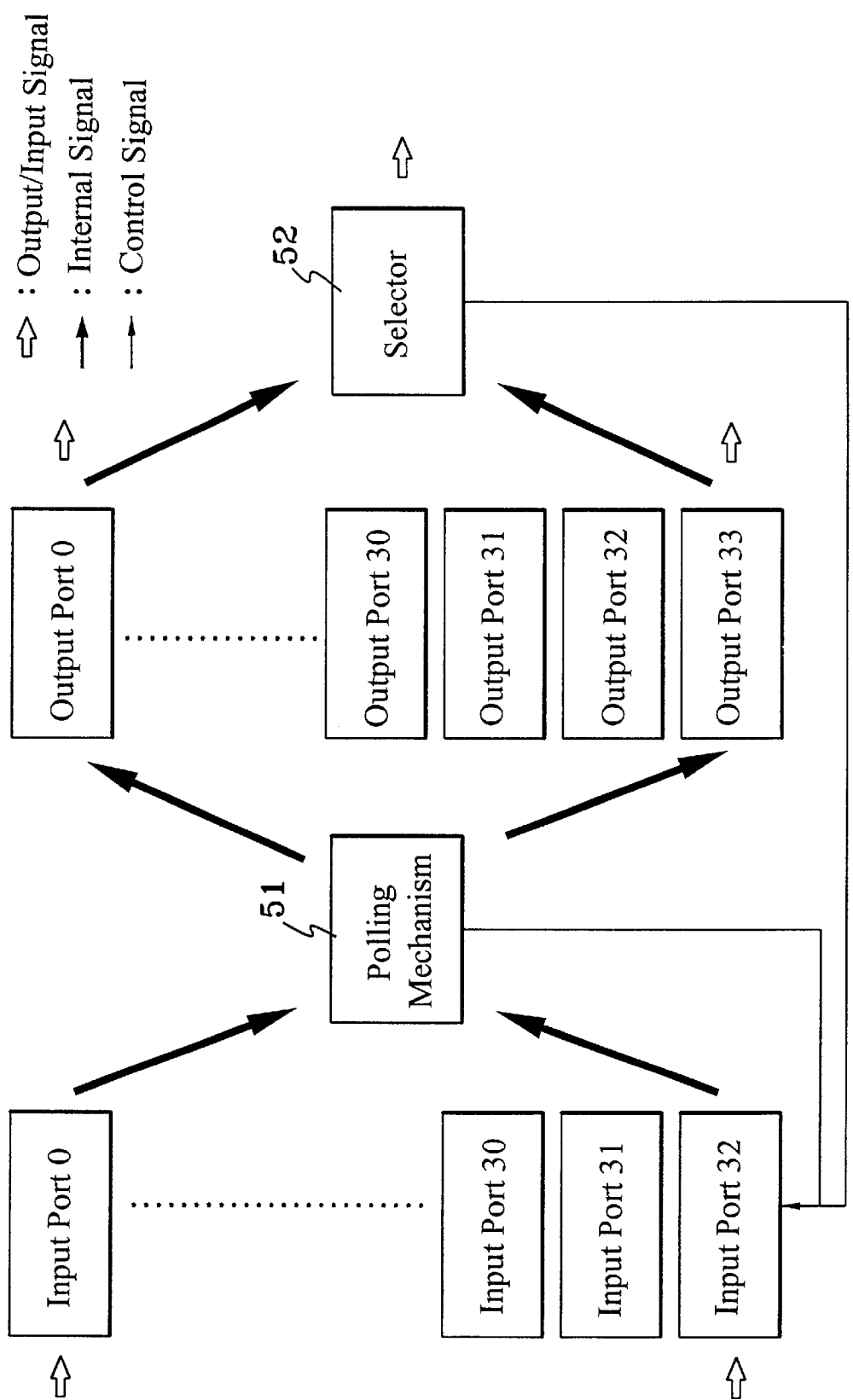
FIG. 1 is a block diagram of a digital data exchange device according to the invention.

51 polling mechanism
52 selector
61 command decoder
62 series-to-parallel format converter
63 first multiplexer
64 demultiplexer
65 address generator
66 read/write pointer controller
661 writing counter
662 reading counter
67 first-in/first-out (FIFO) memory unit
68 second multiplexer
69 pulse generator

DETAILED DESCRIPTION OF THE EMBODIMENT

Since an inter_frame gap occurs between any two data packets. During this inter_frame gap, a polling technique and buffer memory can utilized to replace the conventional method of interruption.

In FIG. 1, there are thirty-three input ports labeled from 0 to 32, and thirty-four output ports, as labeled from 0 to 33. A polling mechanism 51 periodically polls the input ports. When a request is sent from a polled input port, and this request is a new one which has not been processed yet, the output port ID specified by the polled input port is taken from the input port. Then, the input port ID is transmitted to the first-in/first-out memory unit of the requested output port for sequencing, and awaits selection by selector 52. Based on the external receiving conditions the selector 52 determines whether a data path may be established. When an external element allows for the reception of data, the selector 52 will establish data transmission pathways according to the sequence in the first-in/first-out memory unit, in the order of original reception. After the data transmission is completed, the selector 52 will inform the input port that the data transmission has been completed. Only this time can the input port send another request. That is, the input port can not send a second request at an earlier time.

The process for establishing a data pathway between an input port 1 and an output port 33 will be described in the following:

First, the data of the input port 1 which sends a request contains port ID of the output port 33. When polling the input port 1, the polling mechanism 51 detects its request for establishing a data pathway with output port 33, and transmits the port ID of input port 1 to output port 33, and stores it in the first-in/first-out memory unit to be sequenced and to await the construction of a data pathway.

While the port ID of the input port 1 is being sequenced, the polling mechanism 51 continuously polls the other input ports one by one. If input port 1 is polled again, it will be skipped because a previously received request has not been completely processed yet.

If the first-in/first-out memory unit of the output port 33 only stores the port ID of the input port 1, a request by the input port 1 for establishing a data pathway can be accepted by the external facilities connected to the output port 33, if they are available.

When the external facilities of the output port 33 accept the request, the selector 52 finds the port ID of the input port 1 from the first-in/first-out memory unit of the output port 33. According to the port ID of the input port 1, the data from the input port 1 is read via a data bus and then transmitted to the external equipment of the output port 33.

After the output port 33 has received the packet of data from input port 1, the selector 52 informs the input port 1 that the data transmission has been completed. When the input port 1 receives this information, it may proceed to the next request.

Because the output port employs a first-in/first-out memory unit for data buffering, if a plurality of input ports simultaneously send requests to an output port, the requests will be detected one by one and then the port ID of the input ports will be sequentially forwarded to the first-in/first-out memory unit of the output port to be put in order by the polling mechanism. In this way, data pathway requests of different input ports will be evenly processed and the data transmissions will then be completed.

Figure 2:
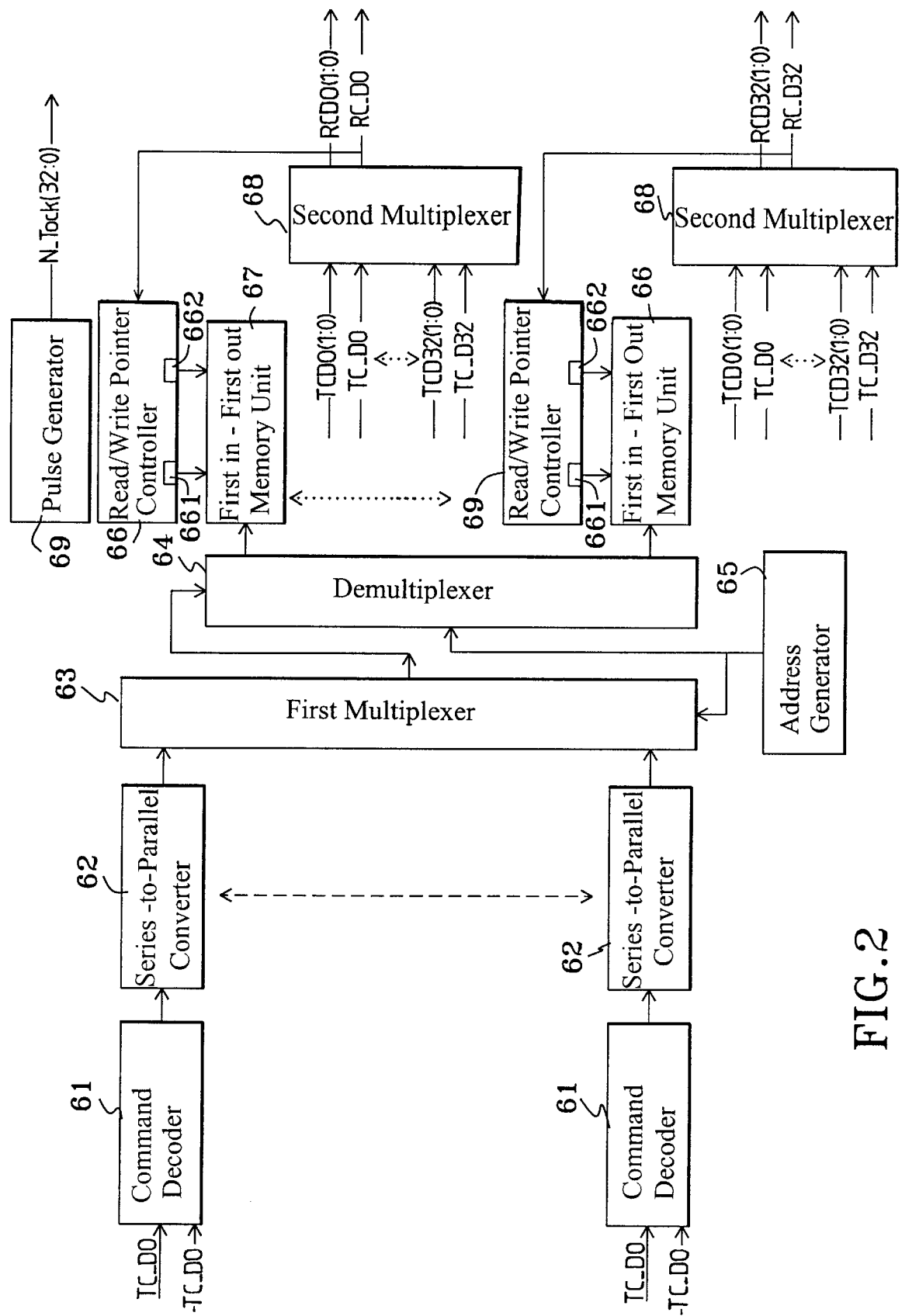
FIG. 2 is a block diagram of a digital data exchange device according to a preferable embodiment of the invention.

In FIG. 2, which depicts FIG. 1 in further detail, each input port comprises a command decoder 61 for decoding input data, and a series-to-parallel format converter 62 for converting the data of the input port from a serial to parallel format. The polling mechanism 51 comprises a first multiplexer 63 for selecting an input port, an address generator 65 for periodically generating the input port IDs, and a demultiplexer 64 for selecting an output port. Each output port comprises a read/write pointer controller 66 for controlling FIFO reading/writing operations and countering time out, a first-in/first-out memory unit 67 for buffering the input port IDs, and a second multiplexer 68 for selecting input data. The above-mentioned selector 52 (shown in FIG. 1) is the second multiplexer 68 of the output ports.

In this embodiment, each input port has two input ports TCDn and TC_Dn, n=0 . . . 32, wherein TCDn is a 2-bit serial input port, and TC_Dn is a control line. When an input port "x" requests for the establishment of a data path with an output port "y", the TC_Dx is on logic "1", with TCDx representing port ID output port "y". When the output port "y" allows the input port "x" to start transmitting data, the TC_Dx is on logic "0", with TCDx representing the specific data to be transmitted to the output port "y". At this time, the data represented by TCDx is transmitted directly to the specified output port "y" without additional processing. The aforementioned symbol "x" denotes an integral number between 0 and 32 (with the number of input ports being 33), and the symbol "y" denotes an integral number between 0 and 33 (with the number of output ports being 34).

The command decoder 41, when TC_Dx is on logic 1, allows for the serial data on TCDx to be converted to parallel data by the series-to-parallel format connector 42.

After the output port ID, stored in the input port x, is sent to a series-to-parallel format converter 62, the first multiplexer 63 switches the data channel to the input port x (the first multiplexer can switch between the input ports 0–32).

The first multiplexer 63 can switch input port channels by means of an address generator 65. The address generator 65 may periodically generate input port IDs ranging from 0 to 32 for the first multiplexer 63. When the address generator 65 outputs a value of "x", the port ID of the input port x is transmitted to the output port of the first multiplexer via the first multiplexer 63. The signal on the output ports of the first multiplexer 63 is the port ID of the output port y specified by the input port x. The drawback is that some input ports are overlooked. This problem can be overcome by periodically polling each input port. It should be noted that since the periodic polling is completed during the inter_frame gap between data packets, the actual time and efficiency of data transmission will not be affected.

The port ID of the output port y connected to the control side of the first multiplexer 63 may select a demultiplexer 64 to switch data channels to the output port y so that the output value x of the address generator 65 (for example, the port ID of the input port x) is concurrently transmitted to the output port y.

Then, the port ID of the input port x is entered into the first-in/first-out memory unit 67 of the output port y to be put in sequence and to wait for the establishment of a data pathway.

The input port ID is written into a specified position in the first-in/first-out memory unit according to a read/write pointer controller 66, wherein the specified position is determined by a writing counter 661 in the read/write pointer controller 66. After the input port ID is completely written in, the counter value of the writing counter 661 will be directed to the next available position, to wait for writing in the next data entry.

After the port ID of the input port x is written into the first-in/first-out memory unit, the reading counter 661 in the read/write pointer controller 66 counts up to the position where this port ID is stored. Then, the port ID of the input port x is read out from the first-in/first-out memory unit 67.

At this time, the output data of the first-in/first-out memory unit 67 is used to control the second multiplexer 68, and it switchs the data channel of the second demultiplexer 68 to the position specified by the input port x. Therefore, the data on the input ports TCDx and TC_Dx are transmitted to the output ports RCDy and RC_Dy via the second multiplexer 68, wherein the output ports RCDy and RC_Dy are connected to external facilities, which may for example be a terminal or a server.

After the external facilities have completed receiving the data, they control the reading counter 661 in the read/write pointer controller 66, to count to the next position through the control line RC_Dy in order to read y, for reading the next input port ID stored in the first-in/first-out memory unit 67. Simultaneously, a pulse generator 49 informs the input port x that the data transmission has been completed. Only after that can the input port x to send the next request for establishing a data path. That is, any request sent by the input port x for establishing a data pathway can not be accepted before the input port x is allowed to send a next request.

Furthermore, when noise interference occurs, a data pathway may be wrongly connected, causing the port ID of an input port to occupy an output port, such that other input ports can not communicate with this output port. In this invention, a time out mechanism located in the read/write pointer controller 66 functions to remove the input port ID from the output port, thereby preventing dead lock, which occurs when the port ID of the input port stays on the output port for an excessive time interval and the data can't be received from the input port.

The digital data exchange device of the invention can cooperate with port ICs which can match with the output/input ports thereof to design structures with transmission speeds of 10/100 M, 1 G and 2 G for different requirements.

Figure 3:
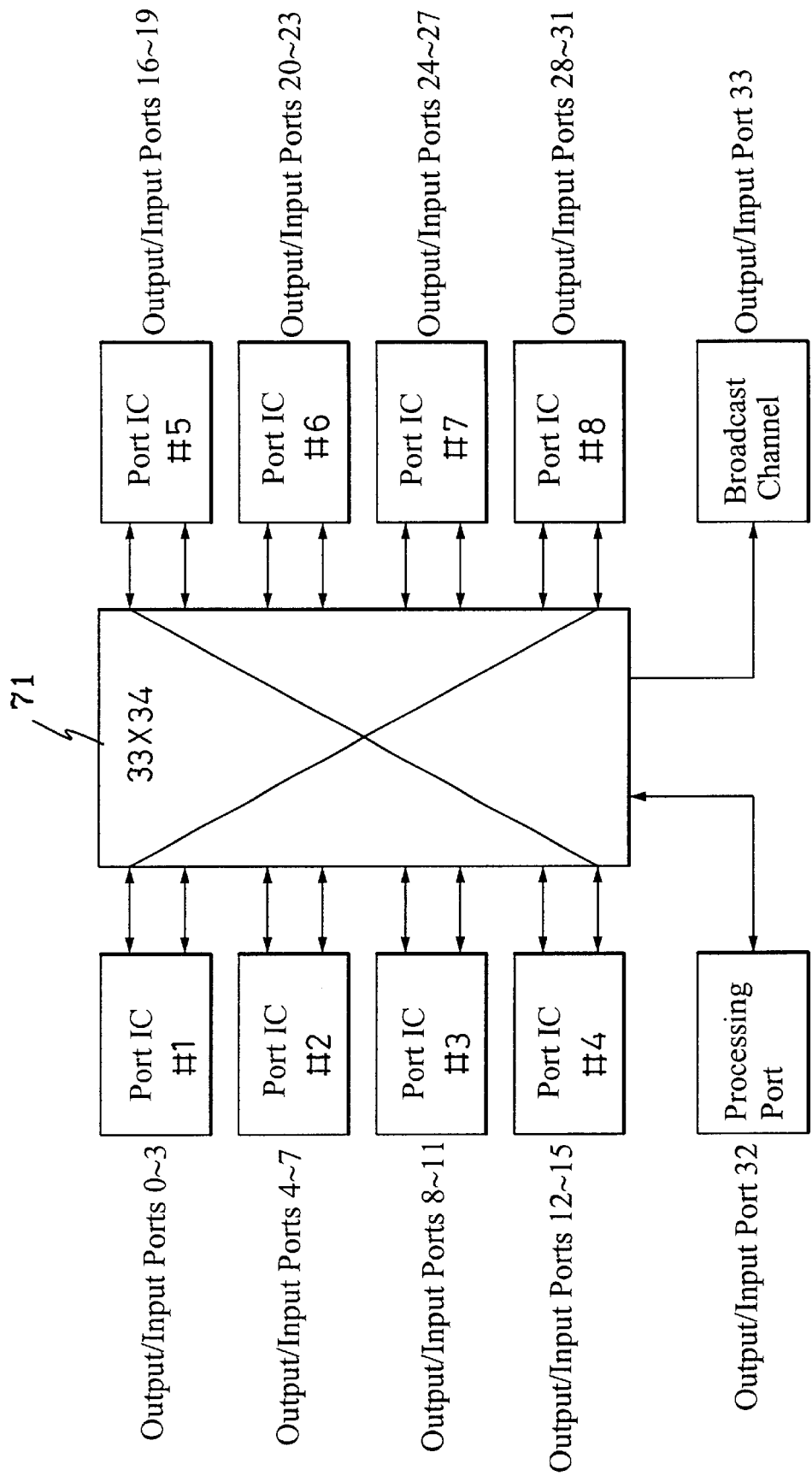
FIG. 3 is a layout showing a digital data exchange device with a transmission rate of 10/100 MHz according to the invention.

In FIG. 3, which shows the layout of a structure with a transmission speed of 10/100 M, the total number of port ICs is 8, each of which has 4 output/input ports. Therefore, the total number of output/input ports is 32. The output/input port 32 is used for network management, and the only output port 33 is used for broadcasting network information.

Figure 4:
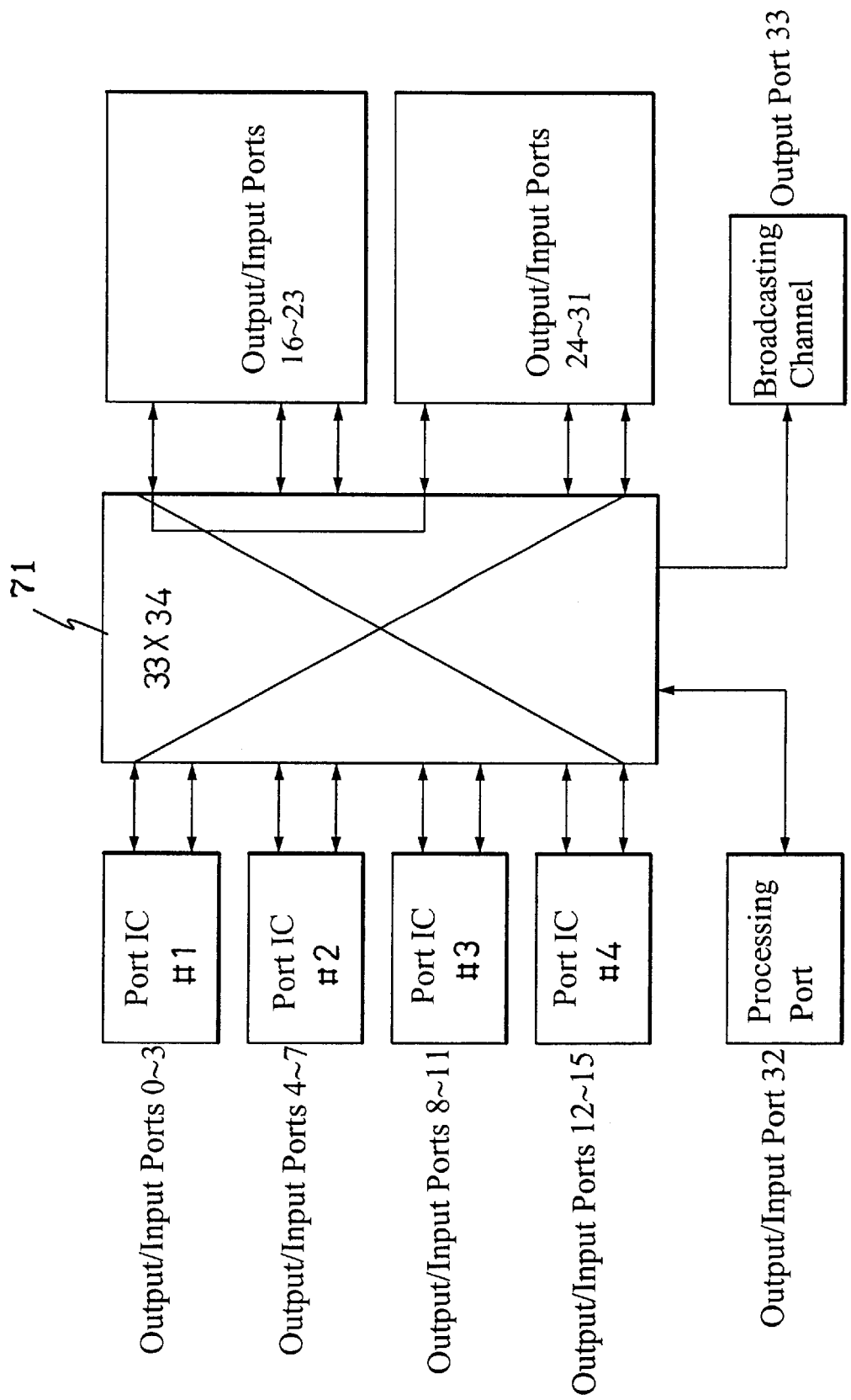
FIG. 4 is a layout showing a digital data exchange device with a transmission rate of 1 GHz according to the invention.

Referring to FIG. 4, one can see that the eight output/input ports 16 through 23 are connected to a Giga Port 1 so that the transmission speed can reach 1 GHz. The other port ICs remain connected to two output/input ports. In general, the connecting of the Giga Port 1 is used for mass transmission requirements for mechanisms such as servers.

Figure 5:
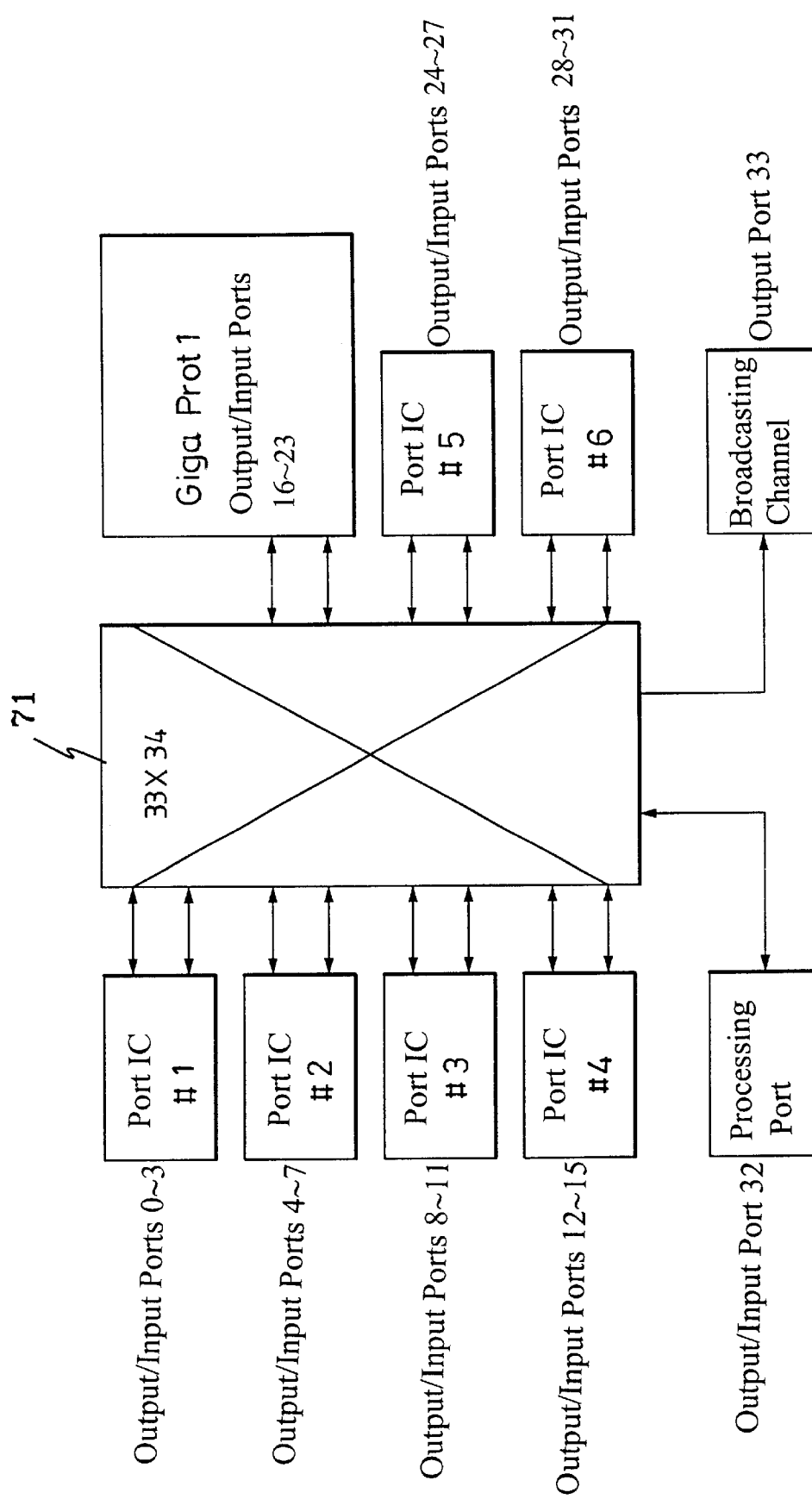
FIG. 5 is a layout showing a digital data exchange device with a transmission rate of 2 GHz according to the invention.

Similarly, if a transmission speed of 2 GHz is required, it can be attained by combining two Giga Ports. FIG. 5 shows an example of the combination of Giga Port 1 and Giga Port 2, wherein each Giga Port still uses eight output/input ports.

In view of the above-mentioned drawings and descriptions, the address generator can be used to periodically poll each input port, so that the data of each input port can be equally transmitted to an output port, which is especially important for the flow of mass transmissions. Moreover, the dead lock can be prevented by using the time out mechanism. Notably, the structures laid out by the invention can be configured for the different requirements of network structures. Therefore, the present invention does prove to be very useful.

Although the invention has been disclosed in terms of a preferred embodiment, the disclosure is not intended to limit the invention. Those skilled in the art can make modifications without departing from the original intent and purpose of the invention defined by the appended claims.

What is claimed is:

1. A digital data exchange device for the dynamically electrical connection of a plurality of input ports to a plurality of output ports, comprising:

a first multiplexer connected to the plurality of input ports, for selecting an output port thereof, thereby outputting data of said input port, wherein the data of the input port contains an output port ID;

a demultiplexer, connected to the first multiplexer and the plurality of output ports, for selecting the output port based on the selected output port ID, thereby outputting the input port ID to the output port; and an address generator connected to the first multiplexer and demultiplexer, for generating input port IDs for the plurality of input ports in sequence, so that the first multiplexer selects the input port, and then the input port ID is outputted to the selected output port based on the output port ID by use of the demultiplexer, thereby connecting the input port to the output port.

2. A digital data exchange device for the dynamically electrical connection of a plurality of input ports to a plurality of output ports, comprising:

a first multiplexer connected to the plurality of input ports, for selecting an output port thereof, thereby outputting data of said input port, wherein the data of the input port contains an output port ID;

a demultiplexer, connected to the first multiplexer and the plurality of output ports, for selecting the output port based on the selected output port ID, thereby outputting the input port ID to the output port; and an address generator connected to the first multiplexer and demultiplexer, for generating input port IDs for the plurality of input ports in sequence, so that the first multiplexer selects the input port, and then the input port ID is outputted to the selected output port based on the output port ID by use of the demultiplexer, thereby connecting the input port to the output port; and wherein each input port of the plurality of input ports comprising:

a command decoder for decoding input data; and a series-to-parallel format converter, electrically connected to the command decoder and the first multiplexer, for converting the data of the input port from serial format to parallel format.

3. A digital data exchange device for the dynamically electrical connection of a plurality of input ports to a plurality of output ports, comprising:

a first multiplexer connected to the plurality of input ports, for selecting an output port thereof, thereby outputting data of said input port, wherein the data of the input port contains an output port ID;

a demultiplexer, connected to the first multiplexer and the plurality of output ports, for selecting the output port based on the selected output port ID, thereby outputting the input port ID to the output port; and an address generator connected to the first multiplexer and demultiplexer, for generating input port IDs for the plurality of input ports in sequence, so that the first multiplexer selects the input port, and then the input port ID is outputted to the selected output port based on the output port ID by use of the demultiplexer, thereby connecting the input port to the output port; and wherein the output port comprises:

a first-in/first-out (FIFO) memory unit electrically connected to the demultiplexer in which the input port ID outputted from the demultiplexer is written into the FIFO memory for an address writing operation, and the input port ID is read out from the FIPO memory for an address reading operation;

a second multiplexer electrically connected to the first-in/first-out memory unit and the input port, for passing the data of the input port through the output port for the address reading operation of the first-in/first-out memory unit; and a read/write pointer controller electrically connected to the first-in/first-out memory unit for recording the address writing reading operations, and updating the values for the address reading and address writing operations of the first-in/first-out memory unit, thereby sequentially processing address reading/writing operations.

4. A digital data exchange device as claimed in claim 3, which further comprises a pulse generator electrically connected to the plurality of output ports for sending a signal identified by the input port when the port ID of the said input port is transmitted to the second multiplexer.

5. A digital data exchange device as claimed in claim 3, wherein the second multiplexer provides x inputs-to-1 output, where x>1.

6. A digital data exchange device as claimed in claim 5, wherein the demultiplexer is a 1 input-to input to y, where y>x.

7. A digital data exchange device as claimed in claim 3, wherein the read/write pointer controller comprises:

a writing counter, electrically connected to the first-in/first-out memory unit, for sequentially recording address writing operations; and a reading counter, electrically connected to the first-in/first-out memory unit, for sequentially recording address reading operations.

8. A digital data exchange device as claimed in claim 2, wherein the first multiplexer has x inputs-to-1 output, where x>1.

9. A digital data exchange device as claimed in claim 2, wherein the address generator is a counter which periodically generates input port IDs ranging from 0 to x, where x>1.

10. A digital data exchange device for the dynamically electrical connection of a plurality of input ports to a plurality of output ports, comprising:

a first multiplexer connected to the plurality of input ports, for selecting an output port thereof, thereby outputting data of said input port, wherein the data of the input port contains an output port ID;

a demultiplexer, connected to the first multiplexer and the plurality of output ports, for selecting the output port based on the selected output port ID, thereby outputting the input port ID to the output port; and an address generator connected to the first multiplexer and demultiplexer, for generating input port IDs for the plurality of input ports in sequence, so that the first multiplexer selects the input port, and then the input port ID is outputted to the selected output port based on the output port ID by use of the demultiplexer, thereby connecting the input port to the output port; and wherein the number of the plurality of output ports is 34, and the number of said plurality of input ports is 33.

* * * * *